US007068667B2

(12) United States Patent
Foster et al.

(10) Patent No.: US 7,068,667 B2
(45) Date of Patent: Jun. 27, 2006

(54) METHOD AND SYSTEM FOR PATH BUILDING IN A COMMUNICATIONS NETWORK

(75) Inventors: Michael S. Foster, Federal Way, WA (US); Michael A. Dorsett, Federal Way, WA (US)

(73) Assignee: The Boeing Company, Seattle, WA (US)

( * ) Notice: Subject to any disclaimer, the term of this patent is extended or adjusted under 35 U.S.C. 154(b) by 987 days.

(21) Appl. No.: 10/046,334

(22) Filed: Oct. 26, 2001

(65) Prior Publication Data

US 2002/0159451 A1    Oct. 31, 2002

Related U.S. Application Data

(60) Provisional application No. 60/314,287, filed on Aug. 22, 2001, provisional application No. 60/314,088, filed on Aug. 21, 2001, provisional application No. 60/314,158, filed on Aug. 21, 2001, provisional application No. 60/287,120, filed on Apr. 27, 2001, provisional application No. 60/286,918, filed on Apr. 27, 2001, provisional application No. 60/286,922, filed on Apr. 27, 2001, provisional application No. 60/287,081, filed on Apr. 27, 2001, provisional application No. 60/287,075, filed on Apr. 27, 2001, provisional application No. 60/287,069, filed on Apr. 27, 2001.

(51) Int. Cl.
*H04L 12/28* (2006.01)
*H04L 12/56* (2006.01)

(52) U.S. Cl. ............... 370/398; 370/422; 370/397; 370/399; 709/223; 709/238; 709/245

(58) Field of Classification Search ............... 370/398, 370/399, 395.31, 395.32, 395, 422, 229, 370/231, 392, 401, 390, 389, 351, 397, 357, 370/396, 235, 466, 352, 412, 354, 388, 385, 370/476, 463, 359; 709/223, 239, 202, 205, 709/238, 245, 246, 225, 226, 249, 250, 220, 709/230, 231, 208–216, 217, 232; 713/201, 713/200; 710/5–7, 4, 52, 22–28, 36–51, 710/305, 33, 105, 301, 310, 263, 3
See application file for complete search history.

(56) References Cited

U.S. PATENT DOCUMENTS

| | | | |
|---|---|---|---|
| 4,777,595 A | * | 10/1988 | Strecker et al. ............ 709/236 |
| 4,872,160 A | | 10/1989 | Hemmady et al. |
| 5,247,516 A | | 9/1993 | Bernstein et al. |
| 5,303,233 A | | 4/1994 | Sugawara |
| 5,327,426 A | | 7/1994 | Dolin, Jr. et al. |
| 5,327,552 A | | 7/1994 | Liew |
| 5,339,318 A | | 8/1994 | Tanaka et al. |
| 5,343,473 A | | 8/1994 | Cidon et al. |
| 5,412,653 A | | 5/1995 | Hoppe et al. |
| 5,432,783 A | | 7/1995 | Ahmed et al. |
| 5,440,547 A | | 8/1995 | Easki et al. |
| 5,548,639 A | | 8/1996 | Ogura et al. |
| 5,550,816 A | | 8/1996 | Hardwick et al. |
| 5,590,119 A | | 12/1996 | Moran et al. |
| 5,675,579 A | | 10/1997 | Watson et al. |
| 5,675,807 A | | 10/1997 | Iswandhi et al. |
| 5,680,402 A | | 10/1997 | Olnowich et al. |
| 5,689,505 A | | 11/1997 | Chiussi et al. |
| 5,689,506 A | | 11/1997 | Chiussi et al. |
| 5,689,689 A | | 11/1997 | Meyers et al. |
| 5,734,719 A | | 3/1998 | Tsevdos et al. |
| 5,751,932 A | | 5/1998 | Horst et al. |
| 5,751,955 A | | 5/1998 | Sonnier et al. |
| 5,774,067 A | | 6/1998 | Olnowich et al. |
| 5,790,546 A | | 8/1998 | Dobbins et al. |
| 5,790,776 A | | 8/1998 | Sonnier et al. |
| 5,805,804 A | | 9/1998 | Laursen et al. |
| 5,809,025 A | | 9/1998 | Timbs |
| 5,818,842 A | | 10/1998 | Burwell et al. |
| 5,838,894 A | | 11/1998 | Horst |
| 5,867,501 A | | 2/1999 | Horst et al. |
| 5,872,783 A | * | 2/1999 | Chin ................... 370/395.32 |

| | | |
|---|---|---|
| 5,881,246 A | 3/1999 | Crawley et al. |
| 5,892,766 A * | 4/1999 | Wicki et al. ............... 370/412 |
| 5,892,923 A | 4/1999 | Yasuda et al. |
| 5,898,830 A | 4/1999 | Wesinger et al. |
| 5,914,953 A | 6/1999 | Krause et al. |
| 5,917,820 A | 6/1999 | Rekhter |
| 5,940,596 A | 8/1999 | Rajan et al. |
| 5,943,339 A | 8/1999 | Mauger |
| 5,953,338 A | 9/1999 | Ma et al. |
| 5,964,835 A | 10/1999 | Fowler et al. |
| 5,999,531 A | 12/1999 | Ferolito et al. |
| 6,021,263 A | 2/2000 | Kujoory et al. |
| 6,021,495 A | 2/2000 | Jain et al. |
| 6,028,863 A | 2/2000 | Sasagawa et al. |
| 6,032,205 A | 2/2000 | Ogimoto et al. |
| 6,034,956 A * | 3/2000 | Olnowich et al. .......... 370/388 |
| 6,041,049 A | 3/2000 | Brady |
| 6,047,323 A | 4/2000 | Krause |
| 6,078,963 A | 6/2000 | Civanlar et al. |
| 6,085,238 A | 7/2000 | Yuasa et al. |
| 6,094,712 A | 7/2000 | Follett et al. |
| 6,104,700 A | 8/2000 | Haddock et al. |
| 6,108,708 A | 8/2000 | Iwata |
| 6,147,976 A * | 11/2000 | Shand et al. ............... 370/254 |
| 6,151,316 A | 11/2000 | Crayford et al. |
| 6,151,689 A | 11/2000 | Garcia et al. |
| 6,157,967 A | 12/2000 | Horst et al. |
| 6,169,742 B1 | 1/2001 | Chow et al. |
| 6,172,991 B1 | 1/2001 | Mori |
| 6,195,335 B1 | 2/2001 | Calvignac et al. |
| 6,215,412 B1 | 4/2001 | Franaszek et al. |
| 6,216,173 B1 | 4/2001 | Jones et al. |
| 6,216,200 B1 | 4/2001 | Yeager |
| 6,219,706 B1 | 4/2001 | Fan et al. |
| 6,262,976 B1 | 7/2001 | McNamara |
| 6,278,714 B1 | 8/2001 | Gupta |
| 6,292,488 B1 | 9/2001 | Filgate |
| 6,292,839 B1 | 9/2001 | Naudus et al. |
| 6,301,252 B1 | 10/2001 | Rangachar |
| 6,304,549 B1 | 10/2001 | Srinivasan et al. |
| 6,381,242 B1 | 4/2002 | Maher, III et al. |
| 6,381,244 B1 | 4/2002 | Nishimura et al. |
| 6,385,197 B1 | 5/2002 | Sugihara |
| 6,396,815 B1 | 5/2002 | Greaves et al. |
| 6,400,730 B1 | 6/2002 | Latif et al. |
| 6,411,806 B1 | 6/2002 | Garner et al. |
| 6,430,626 B1 | 8/2002 | Witkowski et al. |
| 6,460,088 B1 | 10/2002 | Merchant |
| 6,493,347 B1 | 12/2002 | Sindhu et al. |
| 6,510,151 B1 | 1/2003 | Cioli et al. |
| 6,535,518 B1 | 3/2003 | Hu et al. |
| 6,542,739 B1 | 4/2003 | Garner |
| 6,556,547 B1 | 4/2003 | Srikanth et al. |
| 6,563,831 B1 | 5/2003 | Dally et al. |
| 6,578,122 B1 * | 6/2003 | Beukema et al. ........... 711/163 |
| 6,591,310 B1 * | 7/2003 | Johnson ......................... 710/3 |
| 6,594,329 B1 * | 7/2003 | Susnow ....................... 375/372 |
| 6,594,712 B1 * | 7/2003 | Pettey et al. .................. 710/22 |
| 6,597,691 B1 | 7/2003 | Anderson et al. |
| 6,601,148 B1 * | 7/2003 | Beukema et al. ........... 711/153 |
| 6,608,819 B1 | 8/2003 | Mitchem et al. |
| 6,611,883 B1 * | 8/2003 | Avery ........................... 710/22 |
| 6,614,758 B1 | 9/2003 | Wong et al. |
| 6,622,193 B1 * | 9/2003 | Avery ......................... 710/263 |
| 6,636,516 B1 | 10/2003 | Yamano |
| 6,650,646 B1 | 11/2003 | Galway et al. |
| 6,651,099 B1 | 11/2003 | Dietz et al. |
| 6,697,379 B1 | 2/2004 | Jacquet et al. |
| 6,704,831 B1 * | 3/2004 | Avery ......................... 710/310 |
| 6,707,800 B1 | 3/2004 | Peyrovian et al. |
| 6,760,775 B1 | 7/2004 | Anerousis et al. |
| 6,775,719 B1 * | 8/2004 | Leitner et al. ................. 710/33 |
| 6,810,428 B1 | 10/2004 | Larsen et al. |
| 6,831,916 B1 * | 12/2004 | Parthasarathy et al. ..... 370/359 |
| 6,847,613 B1 | 1/2005 | Mimura et al. |
| 6,859,867 B1 * | 2/2005 | Berry ......................... 711/206 |
| 6,895,006 B1 | 5/2005 | Tasaki et al. |
| 6,914,911 B1 * | 7/2005 | Hallenstål et al. .......... 370/466 |
| 6,917,614 B1 | 7/2005 | Laubach et al. |
| 6,917,987 B1 * | 7/2005 | Parthasarathy et al. ..... 709/249 |
| 6,938,169 B1 | 8/2005 | Caronni et al. |
| 6,944,152 B1 | 9/2005 | Heil |
| 6,948,004 B1 * | 9/2005 | Gasbarro et al. ............ 709/250 |
| 6,990,528 B1 * | 1/2006 | Neal et al. ................... 709/232 |
| 2001/0010692 A1 | 8/2001 | Sindhu et al. |
| 2001/0030968 A1 | 10/2001 | Hallenstal et al. |
| 2002/0028656 A1 | 3/2002 | Yemini et al. |
| 2002/0029287 A1 | 3/2002 | Yemini et al. |
| 2002/0031131 A1 | 3/2002 | Yemini et al. |
| 2002/0049778 A1 | 4/2002 | Bell et al. |
| 2002/0049875 A1 * | 4/2002 | Giora et al. ................. 710/301 |
| 2002/0049878 A1 * | 4/2002 | Biran .......................... 710/305 |
| 2002/0071450 A1 * | 6/2002 | Gasbarro et al. ............ 370/463 |
| 2002/0073257 A1 * | 6/2002 | Beukema et al. ............ 710/105 |
| 2002/0124117 A1 * | 9/2002 | Beukema et al. ............ 709/314 |
| 2002/0124148 A1 * | 9/2002 | Beukema et al. ............ 711/163 |
| 2002/0141424 A1 * | 10/2002 | Gasbarro et al. ............ 370/412 |
| 2002/0154635 A1 | 10/2002 | Liu |
| 2002/0159385 A1 * | 10/2002 | Susnow et al. .............. 370/229 |
| 2002/0159389 A1 | 10/2002 | Foster et al. |
| 2002/0159437 A1 | 10/2002 | Foster et al. |
| 2002/0159446 A1 | 10/2002 | Foster et al. |
| 2002/0159451 A1 | 10/2002 | Foster et al. |
| 2002/0159453 A1 | 10/2002 | Foster et al. |
| 2002/0159456 A1 | 10/2002 | Foster et al. |
| 2002/0159458 A1 | 10/2002 | Foster et al. |
| 2002/0159468 A1 | 10/2002 | Foster et al. |
| 2002/0161887 A1 | 10/2002 | Foster et al. |
| 2002/0161923 A1 | 10/2002 | Foster et al. |
| 2002/0163889 A1 | 11/2002 | Yemini et al. |
| 2002/0167902 A1 | 11/2002 | Foster et al. |
| 2002/0167950 A1 | 11/2002 | Chang et al. |
| 2002/0172195 A1 | 11/2002 | Pekkala et al. |
| 2002/0184392 A1 * | 12/2002 | Parthasarathy et al. ..... 709/249 |
| 2002/0184529 A1 | 12/2002 | Foster |
| 2002/0188754 A1 | 12/2002 | Foster et al. |
| 2002/0191599 A1 * | 12/2002 | Parthasarathy et al. ..... 370/389 |
| 2003/0189927 A1 | 10/2003 | Foster et al. |
| 2003/0202535 A1 | 10/2003 | Foster et al. |
| 2003/0202536 A1 | 10/2003 | Foster et al. |
| 2003/0204618 A1 | 10/2003 | Foster et al. |
| 2003/0210685 A1 | 11/2003 | Foster et al. |
| 2003/0215231 A1 | 11/2003 | Weston-Dawkes et al. |
| 2004/0004966 A1 | 1/2004 | Foster et al. |

FOREIGN PATENT DOCUMENTS

| | | |
|---|---|---|
| EP | 0880298 A2 | 11/1998 |
| WO | WO-02/088981 A1 | 11/2002 |
| WO | WO-02/089418 A1 | 11/2002 |

OTHER PUBLICATIONS

"FloodGate-1 Data Sheet, Enterprise Traffic Management," Checkpoint Software Technologies Ltd., http://www.checkpoint.com, Jan. 1998 (8 pages).

"Getting Started with FireWall-1, A Simple Configuration," Checkpoint Software Technologies Ltd., <http://www.messagenet.co.uk/products/manuals/firewall/tutorial.htm>, Jan. 1997 (7 pages).

InfiniBand, <<http://searchsmb.techtarget.com/gDefinition/0,,sid44_gci>214596,00.html>, Jun. 5, 2001 (3 Pages).

Kohalmi, S., Anatomy of an IP Service Edge Switch: Accelerating Advance IP Services with a Pipelined Architecture, Quarry Technologies, Inc., Jan. 2001 (10 pages).

Meggyesi, Z., "Fiber Channel Overview," <http://hsi.web.cern.ch/HSI/fcs/spec/overview.htm> Research Institute for Particle and Nuclear Physics, Aug. 15, 1994 (10 Pages).

* cited by examiner

*Primary Examiner*—Wellington Chin
*Assistant Examiner*—Jamal A. Fox
(74) *Attorney, Agent, or Firm*—Perkins Coie LLP

(57) ABSTRACT

A method and system for managing an interconnect fabric that connects nodes. A network manager manages an interconnect fabric or network of routing devices (e.g., interconnect fabric modules, switches, or routers) to allow source nodes to transmit data to destination nodes. The network manager receives registration requests from source nodes to send data to destination nodes, configures the routing devices of the network to establish a path from each source node to its destination node, and provides a virtual address to each source node. The virtual address identifies a path from the source node to the destination node. The source node sends the data to its destination node by providing the data along with the virtual address to a routing device of the network.

36 Claims, 8 Drawing Sheets

METHOD AND SYSTEM FOR PATH BUILDING IN A COMMUNICATIONS NETWORK

CROSS-REFERENCE TO RELATED APPLICATION(S)

This application claims the benefit of U.S. Provisional Application No. 60/287,069 entitled "METHOD FOR IMPLEMENTING A CLUSTER NETWORK FOR HIGH PERFORMANCE AND HIGH AVAILABILITY USING A FIBRE CHANNEL SWITCH FABRIC," filed Apr. 27, 2001; U.S. Provisional Application No. 60/287,120 entitled "MULTI-PROTOCOL NETWORK FOR ENTERPRISE DATA CENTERS," filed Apr. 27, 2001; U.S. Provisional Application No. 60/286,918 entitled "UNIFIED ENTERPRISE NETWORK SWITCH (UNEX) PRODUCT SPECIFICATION," filed Apr. 27, 2001; U.S. Provisional Application No. 60/286,922 entitled "QUALITY OF SERVICE EXAMPLE," filed Apr. 27, 2001; U.S. Provisional Application No. 60/287,081 entitled "COMMUNICATIONS MODEL," filed Apr. 27, 2001; U.S. Provisional Application No. 60/287,075 entitled "UNIFORM ENTERPRISE NETWORK SYSTEM," filed Apr. 27, 2001; U.S. Provisional Application No. 60/314,088 entitled "INTERCONNECT FABRIC MODULE," filed Aug. 21, 2001; U.S. Provisional Application No. 60/314,287 entitled "INTEGRATED ANALYSIS OF INCOMING DATA TRANSMISSIONS," filed Aug. 22, 2001; U.S. Provisional Application No. 60/314,158 entitled "USING VIRTUAL IDENTIFIERS TO ROUTE TRANSMITTED DATA THROUGH A NETWORK," filed Aug. 21, 2001, and is related to U.S. patent application Ser. No. 10/062,199 entitled "METHOD AND SYSTEM FOR VIRTUAL ADDRESSING IN A COMMUNICATIONS NETWORK," U.S. patent application Ser. No. 10/066,014 entitled "METHOD AND SYSTEM FOR LABEL TABLE CACHING IN A ROUTING DEVICE," U.S. patent application Ser. No. 10/039,505 entitled "METHOD AND SYSTEM FOR MULTIFRAME BUFFERING IN A ROUTING DEVICE," ; U.S. patent application Ser. No. 10/046,333 entitled "METHOD AND SYSTEM FOR DOMAIN ADDRESSING IN A COMMUNICATIONS NETWORK," U.S. patent application Ser. No. 10/039,404 entitled "METHOD AND SYSTEM FOR INTERSWITCH LOAD BALANCING IN A COMMUNICATIONS NETWORK," U.S. patent application Ser. No. 10/046,572 entitled "METHOD AND SYSTEM FOR INTERSWITCH DEADLOCK AVOIDANCE IN A COMMUNICATIONS NETWORK," U.S. patent application Ser. No. 10/039,877 entitled "METHOD AND SYSTEM FOR CONNECTION PREEMPTION IN A COMMUNICATIONS NETWORK," U.S. patent application Ser. No. 10/061,564 entitled "METHOD AND SYSTEM FOR MULTICASTING IN A ROUTING DEVICE," U.S. patent application Ser. No. 10/046,640 entitled "METHOD AND SYSTEM FOR NETWORK CONFIGURATION DISCOVERY IN A NETWORK MANAGER," U.S. patent application Ser. No. 10/039,703 entitled "METHOD AND SYSTEM FOR RESERVED ADDRESSING IN A COMMUNICATIONS NETWORK," U.S. patent application Ser. No. 10/039,814 entitled "METHOD AND SYSTEM FOR RECONFIGURING A PATH IN A COMMUNICATIONS NETWORK," U.S. patent application Ser. No. 10/066,217 entitled "METHOD AND SYSTEM FOR ADMINISTRATIVE PORTS IN A ROUTING DEVICE," U.S. patent application Ser. No. 10/039,784 entitled "PARALLEL ANALYSIS OF INCOMING DATA TRANSMISSIONS," U.S. patent application Ser. No. 10/066,159 entitled "INTEGRATED ANALYSIS OF INCOMING DATA TRANSMISSIONS," U.S. patent application Ser. No. 10/062,245 entitled "USING VIRTUAL IDENTIFIERS TO ROUTE TRANSMITTED DATA THROUGH A NETWORK," U.S. patent application Ser. No. 10/044,182 entitled "USING VIRTUAL IDENTIFIERS TO PROCESS RECEIVED DATA ROUTED THROUGH A NETWORK," U.S. patent application Ser. No. 10/044,164 entitled "METHOD AND SYSTEM FOR PERFORMING SECURITY VIA VIRTUAL ADDRESSING IN A COMMUNICATIONS NETWORK," and U.S. patent application Ser. No. 10/068,329 entitled "METHOD AND SYSTEM FOR PERFORMING SECURITY VIA DE-REGISTRATION IN A COMMUNICATIONS NETWORK", which are all hereby incorporated by reference in their entirety.

TECHNICAL FIELD

The described technology relates to a network manager for routing devices of an interconnect fabric.

BACKGROUND

The Internet has emerged as a critical commerce and communications platform for businesses and consumers worldwide. The dramatic growth in the number of Internet users, coupled with the increased availability of powerful new tools and equipment that enable the development, processing, and distribution of data across the Internet have led to a proliferation of Internet-based applications. These applications include e-commerce, e-mail, electronic file transfers, and online interactive applications. As the number of users of, and uses for, the Internet increases so does the complexity and volume of Internet traffic. According to UUNet, Internet traffic doubles every 100 days. Because of this traffic and its business potential, a growing number of companies are building businesses around the Internet and developing mission-critical business applications to be provided by the Internet.

Existing enterprise data networks ("EDNs") that support e-commerce applications providing services to customers are straining under the demand to provide added performance and added services. The growing customer demands for services, along with a highly competitive market, has resulted in increasingly complex ad hoc EDNs. Affordable, high-performance EDN solutions require extensive scalability, very high availability, and ease of management. These attributes are significantly compromised or completely lost as existing solutions are grown to meet the demand.

Current architectures of EDNs typically include three sub-networks: 1) a local area network (LAN) for web and database servers, 2) a computational network for application servers, and 3) a storage area network (SAN). The processing and storage elements attached to these sub-networks may have access to a wide area network (WAN) or metropolitan area network (MAN) through a bridging device commonly known as an edge switch. Each of these sub-networks typically uses a distinct protocol and associated set of hardware and software including network interface adapters, network switches, network operating systems, and management applications. Communication through the EDN requires bridging between the sub-networks that requires active participation of server processing resources for protocol translation and interpretation.

There are many disadvantages to the current architecture of EDNs. The disadvantages result primarily because the multi-tiered architecture is fractured and complex. First, it is very difficult to integrate the disparate systems that use different communications protocols, interfaces, and so on. Second, overall performance suffers because each sub-network is managed separately, rather than being managed with comprehensive knowledge of the complete network. Third, the cost of maintaining three disparate types of network hardware and software can be high. Fourth, it is difficult to scale an architecture that uses such disparate systems. It would be desirable to have an architecture for EDNs that would be alleviate the many disadvantages of the current fractured multi-tiered architectures.

DETAILED DESCRIPTION

Figure 1:
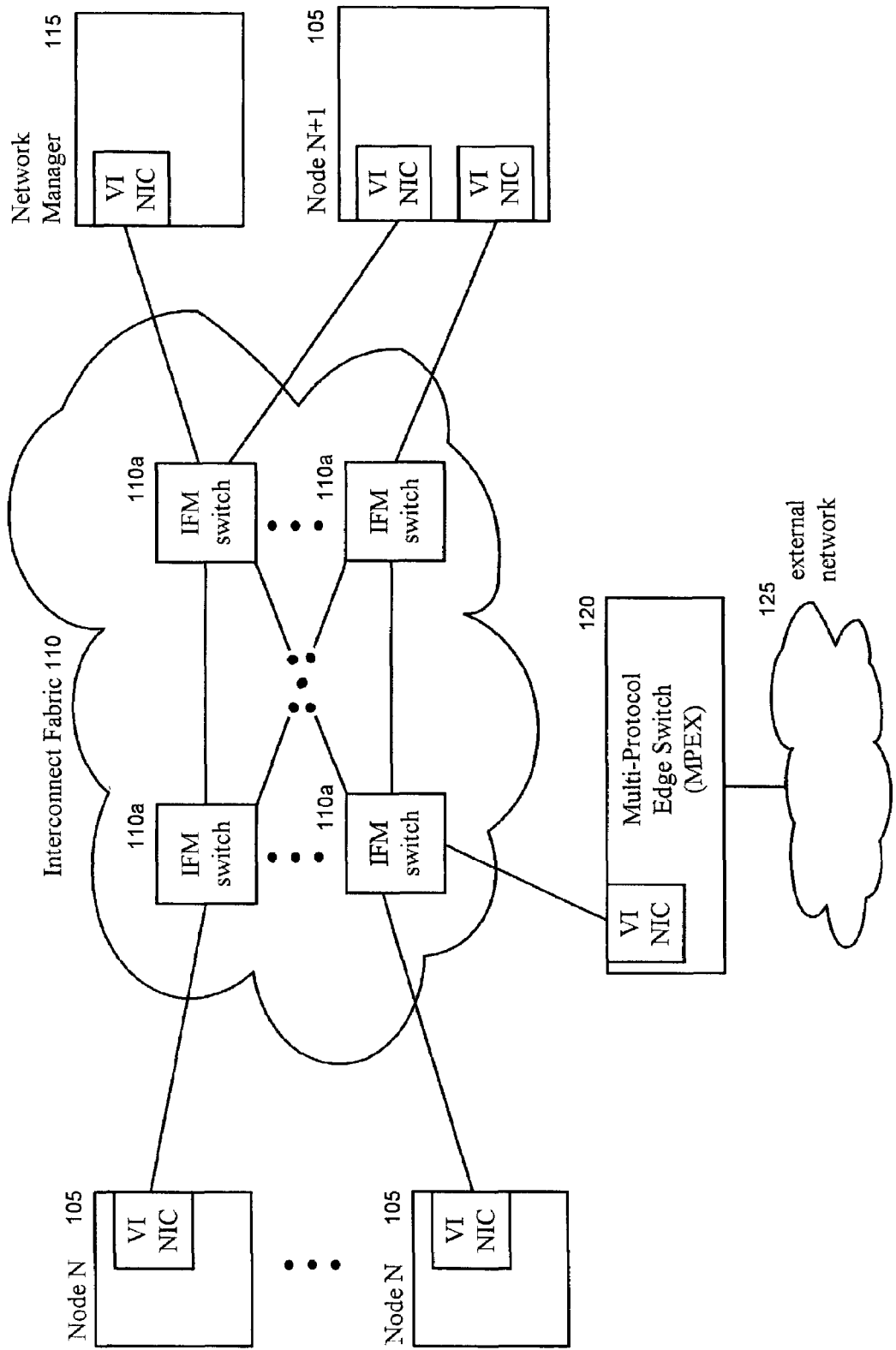
FIG. 1 is a network diagram illustrating various nodes of an example Fibre Channel fabric-based interconnect network that are inter-communicating using virtual identifiers.

A method and system for managing an interconnect fabric that connects nodes is provided. In one embodiment, a network manager manages an interconnect fabric or network of routing devices (e.g., interconnect fabric modules, switches, or routers) to allow source nodes to transmit data to destination nodes. The network manager receives registration requests from source nodes to send data to destination nodes, configures the routing devices of the network to establish a path from each source node to its destination node, and provides a virtual address to each source node. The virtual address identifies a path from the source node to the destination node. The source node sends the data to its destination node by providing the data along with the virtual address to a routing device of the network. Upon receiving the data and the virtual address, a source-side port of each routing device in the path uses the virtual address to identify a destination-side port through which the data and the virtual address are to be transmitted. The network manager configures the routing devices by setting the mappings from a source-side port to a destination-side port for each routing device in the path. The routing devices receive data via source-side ports and transmits data via destination-side ports.

In one embodiment, the network manager may be centralized or distributed. A centralized network manager may reside at one node connected to the interconnect fabric. The centralized network manager may provide configuration information to the routing devices using in-band communications or out-of-band communications. In-band communications refers to the use of the communications links connecting the ports of the routing devices. Out-of-band communications refers to the use of communications links used specifically to connect the routing devices to the network manager. A centralized network manager may alternatively reside within a routing device. Each routing device may have the capabilities to be the network manager. Upon initialization, the routing devices may coordinate to select which of the routing devices is to function as the network manager. A distributed network manager, in contrast, may have its functions performed at various manager devices connected directly to the routing devices. The network manager at each manager device can control the routing device(s) to which it is directly connected. In addition, the network manager at each manager device can communicate with the network managers at other manager devices via in-band or out-of-band communications to coordinate control of the routing devices. In one embodiment, the distributed network manager can have different functions performed at various manager devices.

In one embodiment, the network manager identifies paths through the network from source nodes to destination nodes. The paths may be identified initially when the network manager starts up, may be identified when the network topology (e.g., the routing devices of the network and their interconnections) changes (e.g., as a result of a failure), or may be identified dynamically when a registration request is received from a source node. One skilled in the art will appreciate that various combinations of these techniques for identifying a path may be used. For example, the network manager may identify paths dynamically at registration, but may re-identify paths when the topology of the network changes. Regardless of which of these techniques are used, the network manager would typically need to know the topology of the network to identify the paths.

In one embodiment, the network manager dynamically discovers the topology of the network at initialization. The network manager can discover the topology in several different ways. The network manager can be provided with configuration information that identifies the routing devices of the network. The network manager can use this configuration information to send a message to each routing device asking which of its ports are connected to another device. The network manager can then send a query message via each connected port asking the connected-to device to identify itself and its port. From the responses to the query messages, the network manager can identify the connections (i.e., communications links) between the routing devices and thus the topology of the network. Alternatively, rather than sending a query message to each connected-to port, the routing devices upon initialization can request the connected-to devices to provide their identifications. The routing devices can then provide the identifications of the connected-to ports to the network manager. The configuration information along with the identifications of the connected-to ports describes the network topology.

In another embodiment, the network manager can dynamically discover the identifications of the routing devices by sending query messages through the ports of the routing device to which it is directly connected. The network manager then becomes aware of each routing device that responds to the query. The network manager then sends a query message through the ports of each responding routing device. Alternatively, the network manager can send one query message to the routing device to which it is directly connected and that routing device can forward the query message via each of its ports to the routing device to which it is directly connected. Each port upon receiving the query message may send a message to the network manager with its identification along with the identification of the port to which it is directly connected.

In one embodiment, each routing device may dynamically discover which of its ports are connected to other devices (e.g., nodes or other routing devices) at initialization. Each port of a routing device may sense a characteristic of its communications link (e.g., voltage on a receive link) or may transmit a request and receive (or not receive) a response via its communications link to identify whether a device is connected. The network manager may poll each routing device for an indication of which ports of the routing device are connected to other devices. The network manager can then send a query message to each connected-to port to identify the port to which it is connected.

In one embodiment, the network manager establishes paths through the network of routing devices by configuring the ports of the routing devices along the path. The network manager may identify a path from a source node to a destination node using conventional path identification techniques. For example, the network manager may use a shortest path algorithm to identify the path with the smallest number of communications links or may use a congestion-based algorithm that factors in actual or anticipated network traffic to identify the path. The network manager then identifies a virtual address (i.e., a destination virtual address) for the identified path. The virtual address is sent by the source node along with the data to be transmitted to the destination node. The data and virtual address may be stored in a frame (e.g., Fibre Channel or InfiniBand) that has a header and a payload. The header may contain the virtual address and the payload may contain the data. The network manager then configures each source-side port of each routing device along the path to forward frames sent to the identified virtual address to the destination-side port of the routing device that is connected to the next communications link in the path. The configuration information may be stored in a label table (described below) for the port that maps virtual addresses to destination-side ports. When a source-side port receives a frame with the identified virtual address, it then forwards the frame through the destination-side port in accordance with the configuration information.

In one embodiment, the network manager identifies a virtual address that is not currently in use by any source-side port along the path. Thus, when a source-side port receives a frame addressed with the identified virtual address, there is no ambiguity as which port of the routing device is the destination-side port. It is possible, however, that paths from two different source nodes to the same destination node may have a common sub-path. For example, the path from one source node may be through communications links A, X, Y, and Z, and the path from the other source node may be through communications links B, X, Y, and Z. In such a case, the network manager may use the same virtual address for both paths and share the terminal portion of the already-configured paths.

In one embodiment, the network manager may also establish a path between the destination node and the source node. The network manager may identify a new path or may use the same path that was identified between the source node and the destination node (but in the opposite direction). The network manager then identifies a virtual address (i.e., source virtual address) and configures the ports along the path in a manner that is analogous to the configuration of the path from the source node to the destination node. Whenever a source node sends a frame, it may include the source virtual address in the frame. When the destination node receives the frame, it can respond to the source node by sending a frame addressed to the source virtual address.

In one embodiment, the network manager may need to identify and configure a new path between a source node and a destination node. For example, the network manager may determine that, because of congestion, the required quality of service cannot be provided along the existing path or may detect a failure along the existing path. The network manager may be able to use the same virtual address to configure the new path. If the network manager uses each virtual address only once, then the network manager can use the same virtual address for the new path. If, however, the same virtual address is used to identify different paths, then it may be possible that the configuration of the new path may conflict with the configuration of another path that uses the same virtual address. When the same virtual address can be used, then the network manager can change the path in a manner that is transparent to the source node. In particular, the network manager need not notify the source node of the change in the path. Also, if multiple destination nodes provide the same functionality, then the network manager may implement node load balancing by dynamically changing a path so that data will be sent to a different destination node. The use of these virtual addresses allows the changes to be made without changing the source and destination virtual addresses of the path.

In one embodiment, the network manager may reserve one or more virtual addresses for sending frames from a device (e.g., routing device or node) to the network manager. For example, such a frame may include a registration request from a source node. When the network manager is distributed, a routing device may detect when it has received a frame with a reserved virtual address and may forward the frame directly to the connected manager device for processing by the network manager. To provide flexibility, a frame directed to the network manager may include a combination of a reserved virtual address and another virtual address. When a routing device detects such a frame, it may determine whether it is configured to forward frames directed to the other virtual address using in-band communications. If so, the routing device forwards the frame through the destination-side port identified by the other virtual address. If the routing device is not configured for the other virtual address, then the routing device sends the frame to the network manager via out-of-band communications. For example, the routing device may send the frame to its directly connected manager device. In this way, the network manager can configure the network so that certain frames are forwarded to certain manager devices that provide certain functions or services of the network manager.

In one embodiment, a routing device is an interconnect fabric module ("IFM") with high-speed switching capabilities. An interconnect fabric module can be dynamically configured to interconnect its communications ports so that data can be transmitted through the interconnected ports. Multiple interconnect fabric modules can be connected to form an interconnect fabric through which nodes (e.g., computer systems) can be interconnected. In one embodiment, data is transmitted through the interconnect fabric as frames such as those defined by the Fibre Channel standard. Fibre Channel is defined in ANSI T11 FC-PH, FC-PH-2, FC-PH-3, FC-PI, and FC-FS industry standard documents which are hereby incorporated by reference. One skilled in the art will appreciate, however, that the described techniques can be used with communications standards other than Fibre Channel. In particular, the described techniques can be used with the InfiniBand standard, which is described in the InfiniBand Architecture Specification, Vols. 1–2, Release 1.0, Oct. 24, 2000, which is hereby incorporated by reference. The interconnect fabric module may allow the creation of an interconnect fabric that is especially well suited for interconnecting devices utilizing multiple information types such as might be required by the devices of an enterprise data network ("EDN").

In one embodiment, a virtual address may be part of a "virtual identifier" (e.g., source or destination identifier) that includes a domain address. A destination identifier of a frame may be set to a virtual identifier. The destination identifiers of the frames received by the interconnect fabric modules are used to forward the frame. Each interconnect fabric module is assigned a domain address. The interconnect fabric modules that are assigned the same domain address are in the same domain. The interconnect fabric modules use of the domain addresses to forward frames between domains. The network manager may configure the interconnect fabric modules with inter-domain paths. When an interconnect fabric module receives a frame with a destination domain address that matches its domain address, then the frame has arrived at its destination domain The interconnect fabric module then forwards the frame in accordance with the destination virtual address since it has arrived at its destination domain. If, however, the domain addresses do not match, then the frame has not arrived at its destination domain. The interconnect fabric module forwards the frame using an inter-domain path. Each port of an interconnect fabric module may have a domain address table (configured by the network manager) that maps the domain addresses to the destination port through which frames with that domain address are to be forwarded. Thus, an interconnect fabric module may selectively use virtual addresses and domain addresses when forwarding frames.

In one embodiment, an interconnect fabric module uses a crosspoint switch to switch connect its source and destination ports. When the crosspoint switch has more switch ports than ports of the interconnect fabric module, the extra switch port can be used for administrative functions of the network manager. When an interconnect fabric module receives a frame directed to a virtual address reserved for administrative services of the network manager, the interconnect fabric module connects the source port to the extra switch port which is connected to a manager device. When the frame is transmitted from the source port, the network manager at the manager device receives the frame and processes it in accordance with its administrative functions. In this way, administrative frames can be directly forwarded to the network manager when they are first received by an interconnect fabric module from a node.

In some embodiments, one or more virtual identifier ("VI") Network Interface Controller ("NIC") facilities on each node (e.g., one VI NIC for each network interface) facilitate the use of virtual identifiers in communicating data When a VI NIC on a node receives an indication that a data communication to one or more remote nodes is to occur, such as from an application executing on the node, the VI NIC will identify an appropriate transmittal virtual identifier that can be used to route the data communication through the network to the appropriate remote destination nodes without being assigned to or directly associated with those destination nodes. Such data communications can include both transitory connectionless transmittals of data (e.g., unidirectional transmittals from a source to a destination) and non-transitory connections that allow multiple distinct transmittals of data (e.g., a persistent dedicated connection that allows a connection-initiating source and a connection destination to transmit data back and forth).

The VI NIC can identify an appropriate transmittal virtual identifier for routing a data communication in various ways. In some embodiments, the VI NIC will register some or all outgoing data communications with a network manager for the network, and will receive an appropriate transmittal virtual identifier to be used for that communication from the network manager. If an indicated data communication corresponds to a previously registered data communication (e.g., to an existing connection or to a previous communication to the same destination and in the same transmission manner), however, the VI NIC could instead in some embodiments use the previously received transmittal virtual identifier for that data communication rather than perform an additional registration for the indicated data communication. The manners in which a data communication can be transmitted vary with the transmission characteristics that are supported by a network, and can include factors such as a particular Class Of Service ("COS") or transmission priority.

In some embodiments, when a data communication indicated by a source can result in bi-directional communication (e.g., a response from one or more of the destinations), the VI NIC also identifies a response virtual identifier that can be used for routing data from one or more of the destinations back to the source. If the VI NIC registers the data communication with a network manager, this response virtual identifier may be received from the network manager. After identifying this response virtual identifier, the VI NIC associates it with information indicating how to process received data communications that are routed using the response virtual identifier. In some embodiments, such received data communications are processed by forwarding the data communications to one or more resources associated with the destination node, such as an executing application program, a file on storage, or a device that is part of the node. For example, if a source application on a source node initiates a bi-directional communication, a VI NIC for the source node may associate the response virtual identifier with that source application so that received responses can be forwarded to that source application (which then becomes the destination application for those received communications).

For illustrative purposes, some embodiments are described below in which the VI NIC is used as part of a Fibre Channel or InfiniBand network and/or as part of an EDN architecture. However, those skilled in the art will appreciate that the techniques of the invention can be used in a wide variety of other situations and with other types of networks, and that the invention is not limited to use in Fibre Channel or InfiniBand networks or with EDN architectures.

FIG. 1 is a network diagram illustrating various nodes of an example Fibre Channel fabric-based interconnect network that are inter-communicating using virtual identifiers. In this example embodiment, multiple interconnect fabric modules ("IFMs") 110 with high-speed switching capabilities are used as intermediate routing devices to form an interconnect fabric, and multiple nodes 105, a network manager 115 and a Multi-Protocol Edge Switch ("MPEX") 120 are connected to the fabric. Each of the nodes has at least one VI NIC that uses virtual identifiers when communicating and receiving data. The MPEX is used to connect the Fibre Channel or InfiniBand network to an external network, such as an Ethernet-based network, and similarly includes at least one VI NIC. Data is transmitted through the interconnect fabric using frames such as those defined by the Fibre Channel or InfiniBand standards.

Topology Discovery

Figure 2:
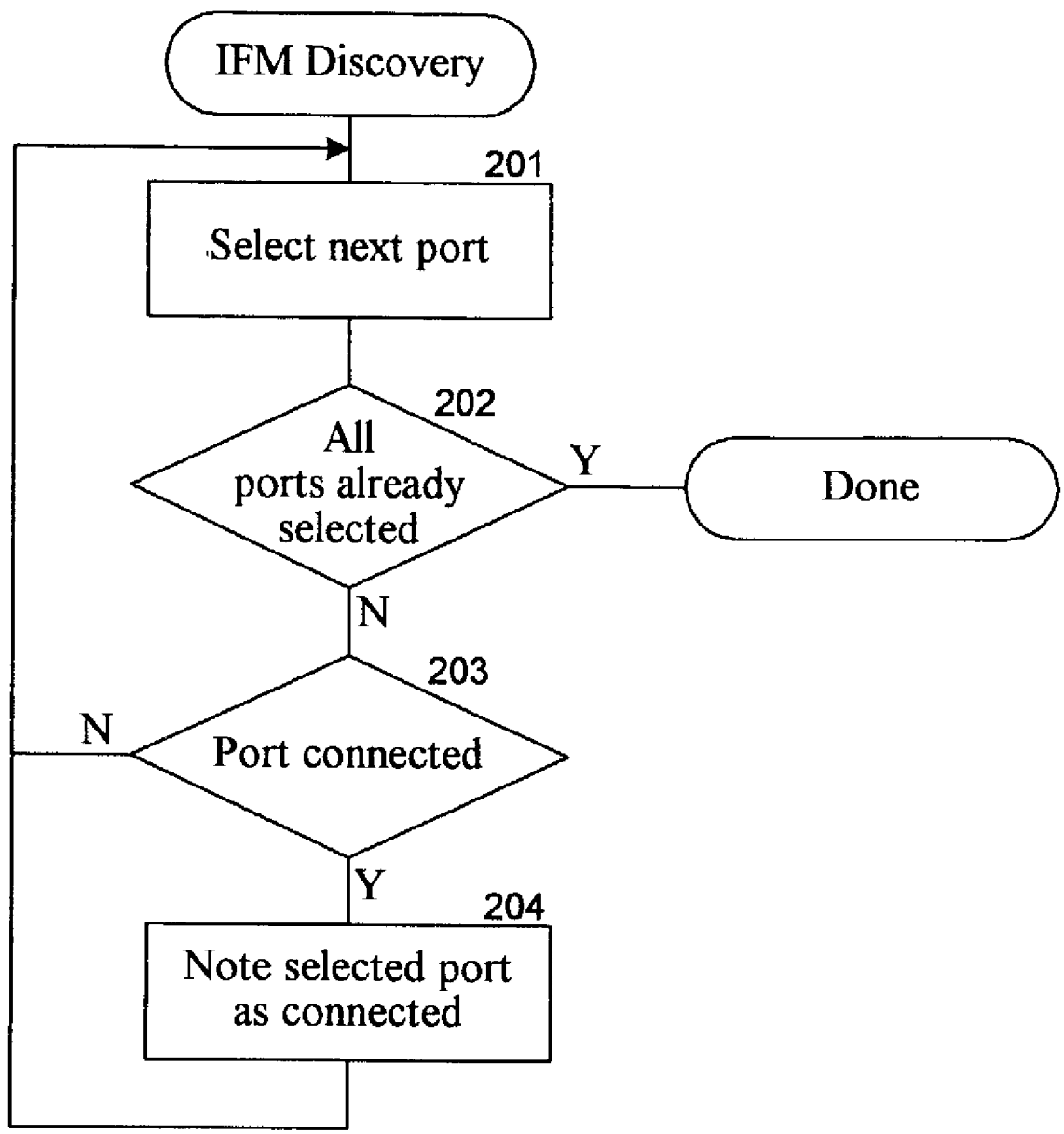
FIG. 2 is a flow diagram illustrating the discovery processing of a component of the interconnect fabric module in one embodiment.

As described above, the network manager may dynamically discover the topology of the network using various different techniques. In the embodiment described below, each interconnect fabric module identifies which of its ports are connected to other devices. The network manager uses this information to send a message through each port that is connected to another device to identify the connected-to device. FIG. 2 is a flow diagram illustrating the discovery processing of a component of the interconnect fabric module in one embodiment. Each port of an interconnect fabric module identifies whether it is connected to a port of another device, such as another switch or a node. The interconnect fabric module then provides to the network manager an indication of which of its ports are connected to other ports to assist in the discovery process. In blocks 201–204, the component determines whether each port is currently connected to another port. In block 201, the component selects the next port. In decision block 202, if all the ports have already been selected, then the component completes, else the component continues at block 203. In decision block 203, the component determines whether the selected port is connected to another port. This determination may be made based on various voltage levels of the communications links. If there is a connection, then the component continues at block 204, else the component loops to block 201 to select the next port of the interconnect fabric module. In block 204, the component notes the selected port as connected to another port and loops to block 201 to select the next port of the interconnect fabric module.

Figure 3:
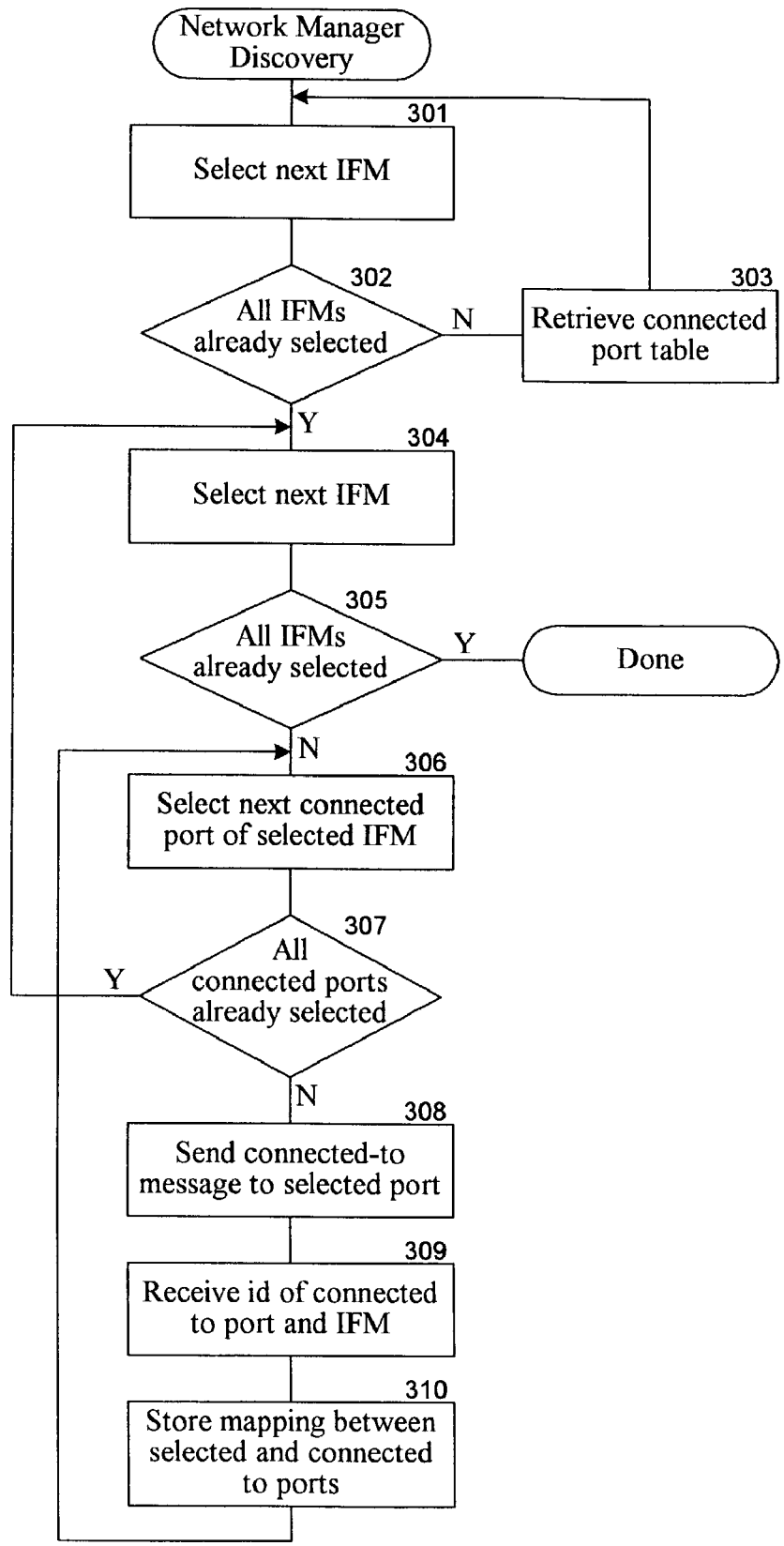
FIG. 3 is a flow diagram illustrating the discovery processing of the network manager in one embodiment.

FIG. 3 is a flow diagram illustrating the discovery processing of the network manager in one embodiment. The network manager first retrieves an indication of which ports of the interconnect fabric modules are connected to other devices. The network manager then sends a query message through each of the indicated ports to the connected-to port. When the connected-to port receives the query message, it responds with an identification of its interconnect fabric module and its port number. In this way, the network manager can discover the topology of the interconnect fabric. In blocks 301–303, the network manager retrieves the indications of which ports of the interconnect fabric modules are connected to other ports. In block 301, the network manager selects the next interconnect fabric module that has not yet been selected. In decision block 302, if all the interconnect fabric modules have already been selected, then the network manager continues at block 304, else the network manager continues at block 303. In block 303, the network manager retrieves an indication of which ports of the selected interconnect fabric module are connected to other ports. The network manager may send the message using either in-band our out-of-band communications. The network manager then loops to block 301 to select the next interconnect fabric module. In blocks 304–310, the network manager determines the identity of each of the connected-to ports. In block 304, the network manager selects the next interconnect fabric module. In decision block 304, if all the interconnect fabric modules have already been selected, then the network manager completes its discovery process, else the network manager continues at block 306. In blocks 306–310, the network manager loops sending a query message through each port of the selected interconnect fabric module that is connected to another port. In block 306, the network manager selects the next port of the selected interconnect fabric module that is connected to another port. In decision block 307, if all such ports are already selected, then the network manager loops to block 304 to select the next interconnect fabric module, else the network manager continues at block 308. In block 308, the network manager sends a query message through the selected port of the selected interconnect fabric module. In block 309, the network manager receives the identification of the connected-to port of the selected port of the selected interconnect fabric module. The identification may include an indication of the interconnect fabric module and the port number of the connected-to port. In block 310, the network manager stores a mapping between the selected port of the selected interconnect fabric module and the connected-to port of the connected-to interconnect fabric module. These mappings define the topology of the network. The network manager then loops to block 306 to select the next port of the selected interconnect fabric module that is connected to another device.

The processing of the discovery of the network manager as described above assumes that the network manager initially is aware of all interconnect fabric modules of the interconnect fabric. One skilled in the art will appreciate that the network manager may become of aware additional interconnect fabric modules during the discovery process. For example, if the network manager is centralized, then it may initially send a query message through its port that is connected to the interconnect fabric. The receiving port responds with the identity and interconnect fabric module and its port number. The network manager can then requested that identified the interconnect fabric module to provide a indication of which of its ports are connected to other ports. The network manager can then send a query message through each of the indicated ports to the connected-to ports. The connected-to ports then respond with the identification of the connected-to interconnect fabric module and connected-to port. This process can be repeated transitively by the network manager to identify all interconnect fabric modules that comprise the interconnect fabric.

Establishing a Path

Figure 4:
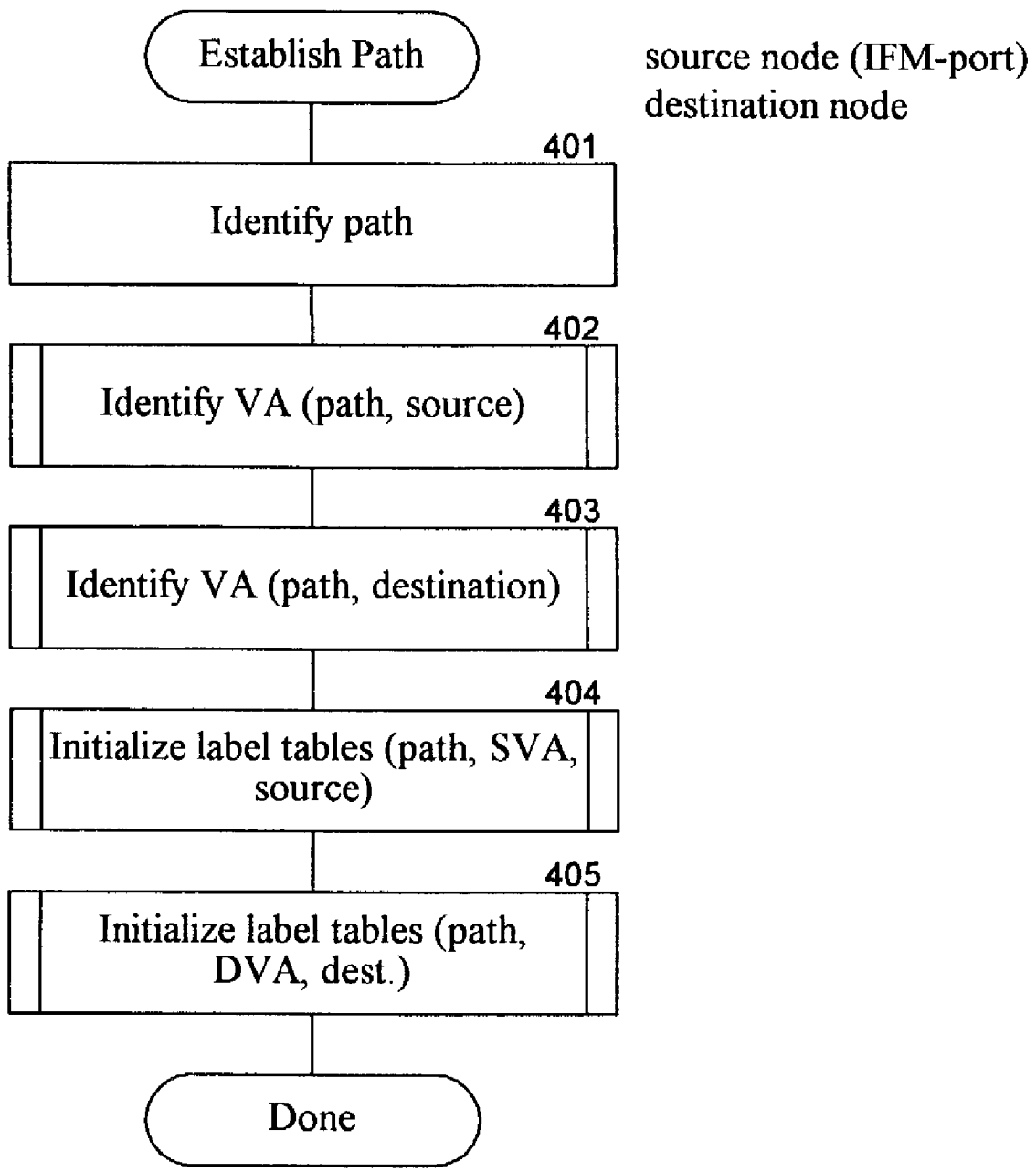
FIG. 4 is a flow diagram illustrating the process of establishing a path by the network manager in one embodiment.

FIG. 4 is a flow diagram illustrating the process of establishing a path by the network manager in one embodiment. A path is typically established when a node registers with the network manager. An establish path component of the network manager may receive an indication of a source node and a destination and then identify paths of ports of interconnect fabric modules from the source node to the destination node and from the destination node to the source node. The component then identifies virtual addresses for the paths and initializes the label tables of the ports of the interconnect fabric modules along the identified paths. A label table of a port contains mappings from virtual addresses to destination-side ports through which a frame sent to that virtual address is to be forwarded. In block 401, the component identifies the paths. In one embodiment, the path from the source node to the destination node and the path from the destination node to the source node use the same ports of the same interconnect fabric modules. That is, the paths use the same communications links. Alternatively, the path in one direction may be different from the path in the other direction. One skilled in the art will appreciate that various well-known techniques for identifying paths can be used. In block 402, the component invokes an identify virtual address component passing an indication of the path and an indication that the virtual address to be used by the source node when sending a communications to the destination node (e.g., the destination virtual address). The invoked component may select a virtual address that is not currently in use by any of the source-side ports of the path. A source-side port of the path is a port that receives data sent by a source node, and a destination-side port of the path is a port through which data is transmitted on its way to the destination node. In block 403, the component invokes in identify virtual address component passing an indication of the path and that the virtual address is to be used by the destination node (e.g., the source virtual address). In block 404, the component invokes a component to initialize the label tables of the source-side ports of the path with the destination virtual address. The invoked component transmits instructions to the each source-side port of the path indicating that the port is to update its label table to map the source virtual address to a destination-side port of the interconnect fabric module. In block 405, the component invokes a component to initialize the label tables of the destination-side ports of the path with the source virtual address. The component then completes.

Figure 5:
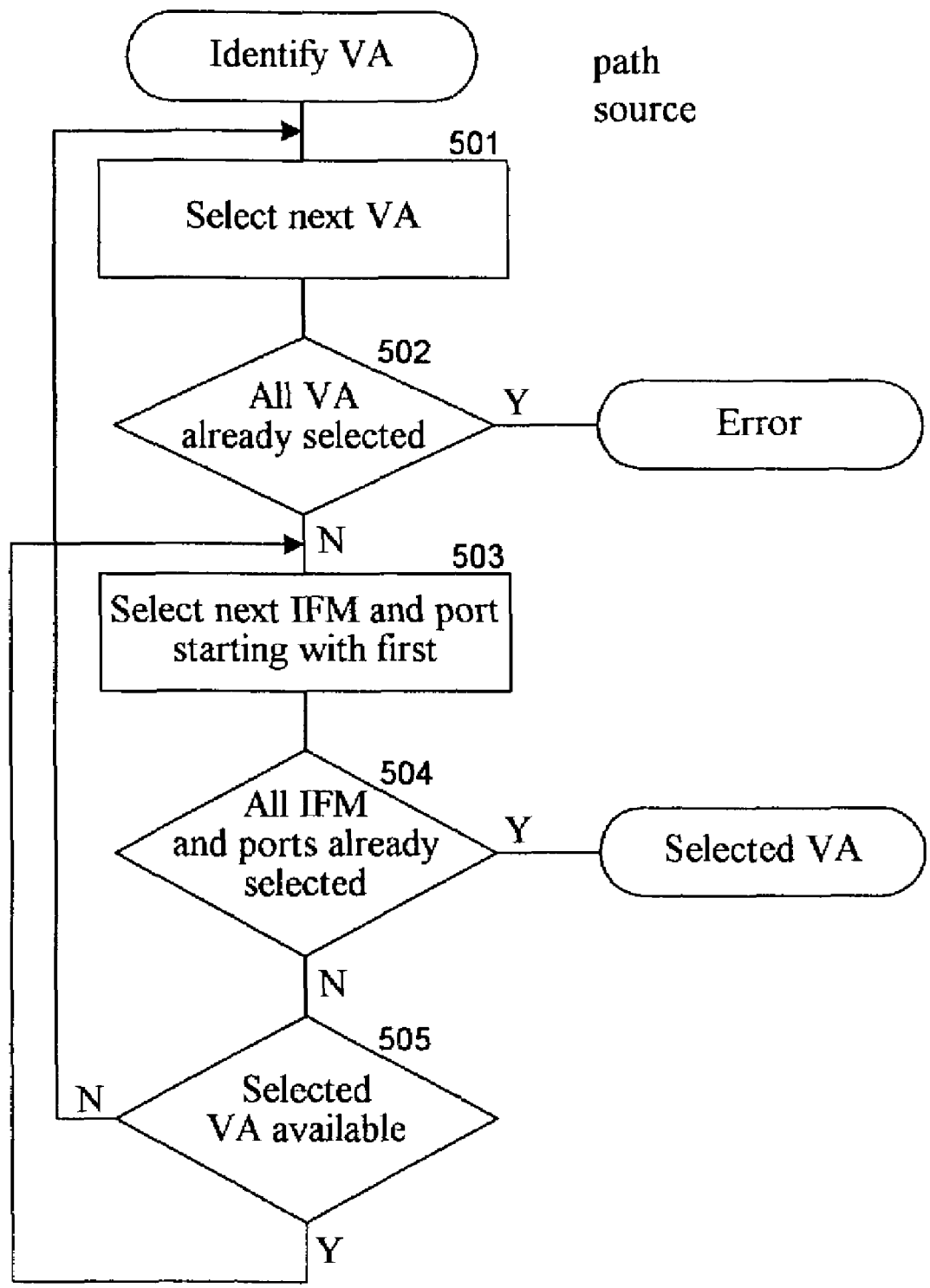
FIG. 5 is a flow diagram illustrating the processing of an identify virtual address component of the network manager in one embodiment.

FIG. 5 is a flow diagram illustrating the processing of an identify virtual address component of the network manager in one embodiment. In this embodiment, the identify virtual address component is provided an indication and a path along with an indication of whether a virtual address for the source node or the destination node is to be identified. The component may check every port along the path to identify a virtual address that is not currently used by a port along the path. Alternatively, the component may identify virtual addresses based on a sequential ordering. That is, the component may keep track of the last identified virtual address and increment that virtual address to identify the next virtual address. In this way, each virtual address is unique. In blocks 501–505, the component loops selecting the next virtual address and determining whether it is available. The virtual address may not be available to a port along the path when that port already uses that virtual address. In blocks 501, the component selects to the next virtual address. In decision block 502, if all the virtual addresses have already been selected, then the component indicates that a virtual address could not be identified, else the component continues at block 503. In blocks 503–505, the component loops selecting each port along the path and determining whether that port already uses the selected virtual address. In block 503, the component selects the next interconnect fabric module and port of the path. In decision block 504, if all the interconnect fabric modules and ports of the path have already been selected, then the component uses the selected virtual address as the identified virtual address and then completes, else the component continues at block 505. In decision block 505, if the selected virtual address is available at the selected interconnect fabric module and selected port, then the component loops to block 503 to select the next port along the path, else the component loops to block 501 to select the next virtual address.

Figure 6:
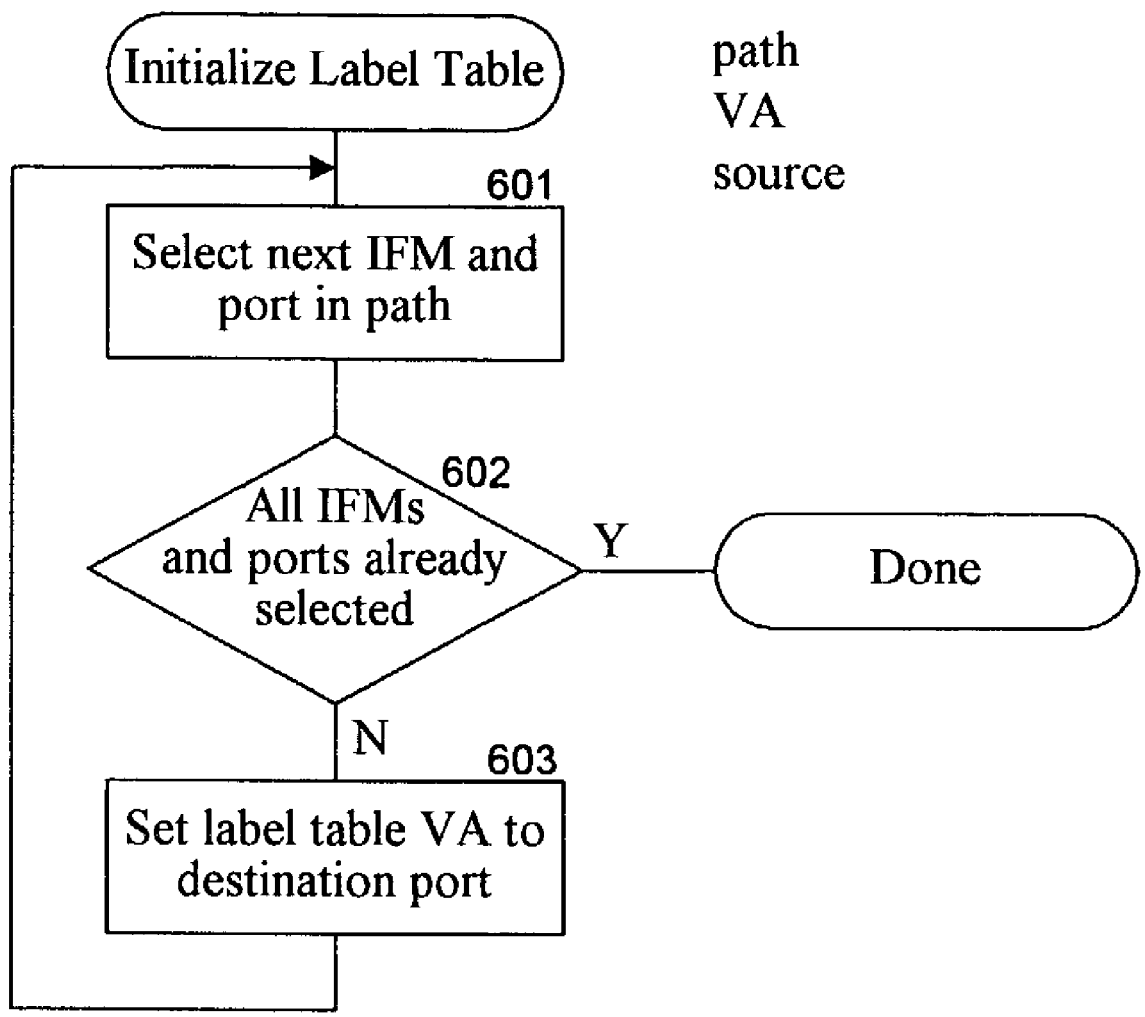
FIG. 6 is a flow diagram illustrating the processing of an initialize label table component of the network manager in one embodiment.

FIG. 6 is a flow diagram illustrating the processing of an initialize label table component of the network manager in one embodiment. The initialize label table component sends a command to each port along the path indicating to add a mapping from the identified virtual address to the other port of that interconnect fabric module along the path. The component is passed in indication of the path, the virtual address, and an indication of whether the virtual address is a source virtual address or a destination virtual address. In block 601, the component selects the next interconnect fabric module and port in the path based on whether the source or destination virtual address has been passed. In decision block 602, if all the interconnect fabric modules along the path have already been selected, then the component completes, else the component continues at block 603. In block 603, the component sends a message to be selected port of the interconnect fabric module indicating to add to its label table a mapping from the virtual address to the other port of the path. The component then loops to block 601 to select the next interconnect fabric module and port in the path.

Reserved Addressing

In one embodiment, the crosspoint switch of an IFM may have more outputs than the number of ports of the IFM. For example, a crosspoint switch may have 34 inputs and outputs, but the IFM may have only 32 ports. The IFM may use these additional ports of the crosspoint switch to route upper layer protocol frames, such as frames directed into a name server or other administrative services. In one embodiment, the additional output ports of the crosspoint switch may be connected to a manager device for the IFM. An interconnect fabric module may have a list of "reserved" addresses that designate an upper layer protocol port. When an IFM determines that an address of its frame matches one of the reserved addresses, it enables the routing of that frame to an upper layer protocol port. The routing to upper layer protocol ports may use the same arbitration mechanism as used for routing to non-upper layer protocol ports as described in the Patent Application entitled "Interconnect Fabric Module." Alternatively, when the crosspoint switch does not have extra output for an upper layer protocol port, an output can be selectively switched between a communications port and an upper layer protocol port depending on whether the address of the destination identifier is reserved.

Figure 7:
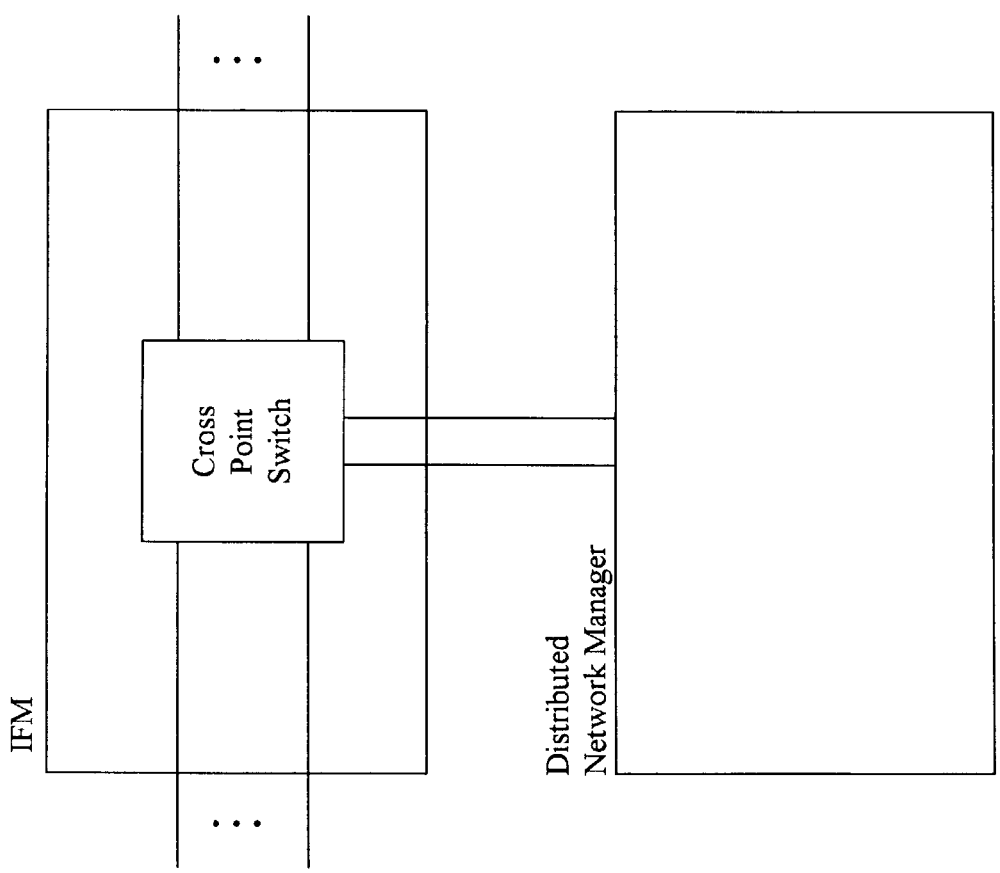
FIG. 7 is a block diagram illustrating a distributed network manager in one embodiment.

FIG. 7 is a block diagram illustrating a distributed network manager in one embodiment. In this embodiment, the network manager may be implemented on a series of manager devices connected directly to the interconnect fabric modules. The distributed network manager may communicate with each other using in-band communication of the interconnect fabric or using out-of-band communication that is independent of the interconnect fabric The crosspoint switch of an interconnect fabric module may have reserved ports for the distributed network manager. When an interconnect fabric module receives data that designates one of the reserved ports, then the interconnect fabric module forwards the data to the distributed network manager through the reserved port.

Figure 8:
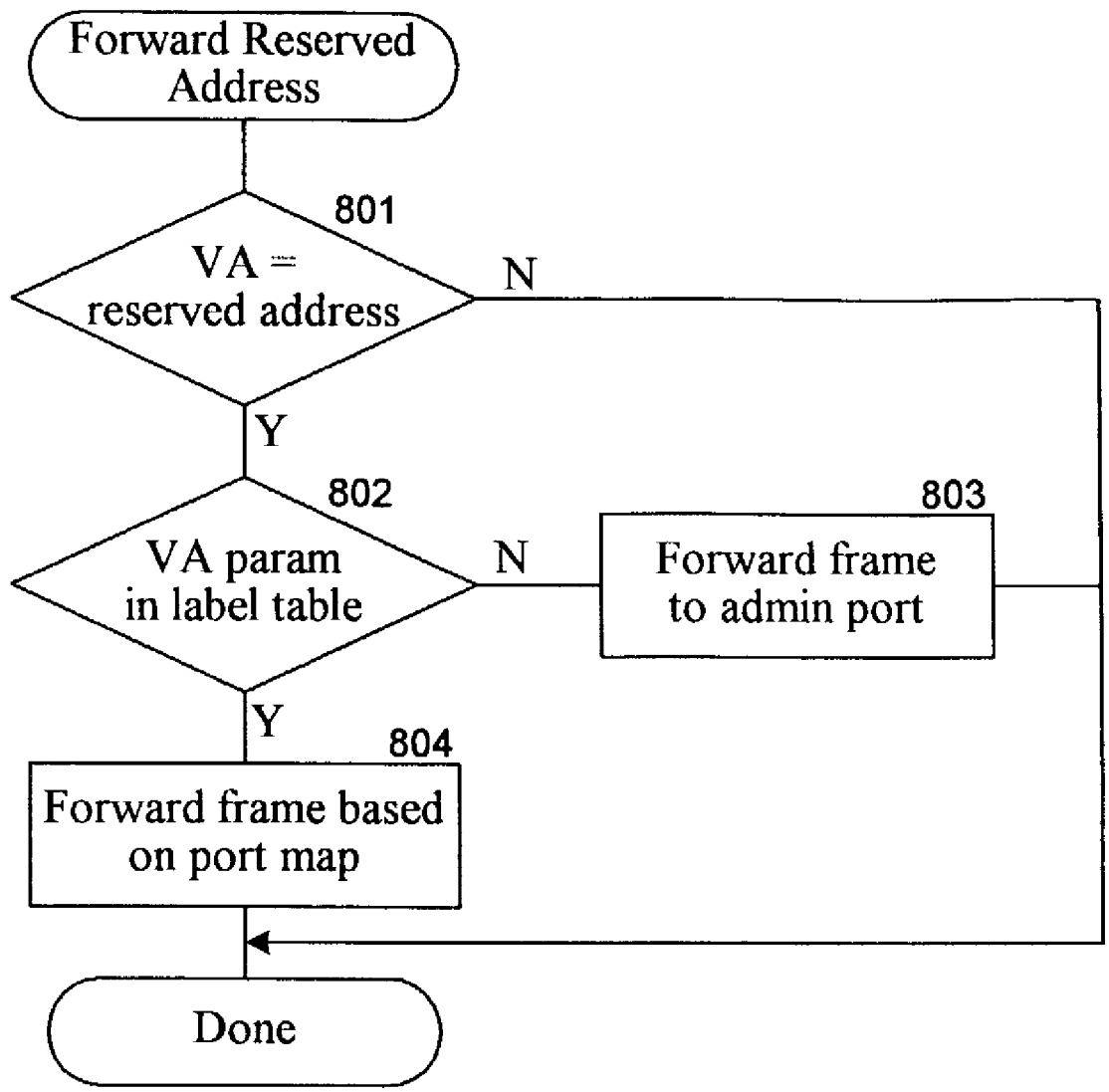
FIG. 8 is a flow diagram illustrating the processing of a component of an interconnect fabric module that processes reserved addresses in one embodiment.

FIG. 8 is a flow diagram illustrating the processing of a component of an interconnect fabric module that processes reserved addresses in one embodiment. This component forwards the frame to the network manager via either in-band or out-of-band communications. With the use of in-band communications the frame can be routed to the appropriate interconnect fabric module, which can then send the frame to the network manager using the out-of-band communications. In block 801, if the virtual address of the received frame is a reserved address, then the component continues at block 802, else the component completes. In decision block 802, if the virtual address parameter within the frame is in the label table, then the frame is to be forwarded using in-band communications and the component continues at block 804, else the frame is to be forwarded directly to the network manager at the IFM's manager device using out-of-band communications and the component continues at block 803. In block 803, the component forwards frame to the administrative port and then completes. In block 804, the component forwards the frame based on the port map of the label table and then completes.

One skilled in the art will appreciate that, although various embodiments of the technology have been described, various modifications may be made without deviating from the spirit and scope of the invention. Accordingly, the invention is not limited except as by the appended claims.

The invention claimed is:

1. A method in a computer system for establishing a path between a source node and a destination node, the method comprising:
    identifying ports of switches forming a path between the source node and the destination node, each switch of the path having a source-side port and a destination-side port;
    identifying a virtual address for sending data from the source node to the destination node such that the virtual address is not currently used by any of the source-side ports; and
    setting each of the source-side ports to switch data sent to the identified virtual address through the destination-side port of its switch, wherein the switches are Fibre Channel switches, wherein the data is changed from an InfiniBand frame to a Fibre Channel frame.

2. The method of claim 1 including:
    identifying a virtual address for sending data from the destination node to the source node such that the virtual address is not currently used by any of the destination-side ports; and
    setting each of the destination-side ports to switch data sent to the identified virtual address through the source-side port of its switch.

3. The method of claim 1 wherein each port of each switch has a virtual address table for mapping virtual addresses to another port of the switch.

4. The method of claim 1 wherein when data is received at a port of a switch, the virtual address of the data is used to retrieve an indication of another port and the data is sent out of the switch through the other port.

5. The method of claim 1 wherein a path is established between the source node and each of a plurality of destination nodes by identifying ports of switches for each path.

6. The method of claim 1 wherein the data is a Fibre Channel frame.

7. The method of claim 1 wherein the switches are interconnect fabric modules.

8. The method of claim 1 wherein when a port of a switch receives data with a virtual address that has not been set for the port, the port does not forward the data.

9. A method for establishing a path between a source node and a destination node through a network of routing devices, the method comprising:
    identifying ports of routing devices forming a path between the source node and the destination node, each routing device of the path having an identified source-side port and an identified destination-side port;
    identifying a virtual address for sending data from the source node to the destination node; and
    setting each of the identified source-side ports to route data sent to the identified virtual address through the identified destination-side port of its routing device, wherein the data is an InfiniBand frame, wherein the InfiniBand frame is changed to a Fibre Channel frame.

10. The method of claim 9 including:
    identifying a virtual address for sending data from the destination node to the source node; and
    setting each of the identified destination-side ports to route data sent to the identified virtual address through the identified source-side port of its routing device.

11. The method of claim 9 wherein a routing device is a switch.

12. The method of claim 9 wherein each routing device has a virtual address table for mapping virtual addresses to another port of the routing device.

13. The method of claim 9 wherein when data is received at a port of a routing device, the virtual address of the data is used to retrieve an indication of another port and the data is sent out of the routing device through the other port.

14. The method of claim 9 wherein a path is established between the source node and each of a plurality of destination nodes by identifying ports of routing devices for each path.

15. The method of claim 9 wherein the routing devices are interconnect fabric modules.

16. The method of claim 9 wherein when a routing device receives data with a virtual address that has not been set for the routing device, the routing device does not forward the data.

17. The method of claim 9 wherein the identified virtual address is not currently used by any of the identified source-side ports.

18. The method of claim 9 wherein the identified virtual address is currently used by an identified source-side port when part of the path is shared by two source nodes sending data to the same destination node.

19. The method of claim 9 including providing the identified virtual address to the source node for use in sending data to the destination node.

20. A network manager for establishing a path between a source node and a destination node through a network of switches, comprising:
    a component that identifies switches forming a path between the source node and the destination node;
    a component that identifies a virtual address for sending data from the source node to the destination node through the identified switches; and
    a component that configures each of the identified switches to route data sent to the identified virtual address through the identified switches from the source node to the destination node, wherein the data is an InfiniBand frame wherein the InfiniBand frame is changed to a Fibre Channel frame.

21. The network manager of claim 20 including:
    a component that identifies a virtual address for sending data from the destination node to the source node; and
    a component that configures each of the identified switches to route data sent to the identified virtual address through the identified switches from the destination node to the source node.

22. The network manager of claim 20 including:
    a component that identifies switches forming a path between the destination node and the source node.

23. The network manager of claim 22 wherein the path from the source node to the destination node includes one port that is not in the path from the destination node to the source node.

24. The network manager of claim 22 wherein the path from the source node to the destination node is different from the path from the destination node to the source node.

25. The network manager of claim 20 wherein each switch has ports with a mapping of virtual addresses to another port of the switch.

26. The network manager of claim 20 wherein when data is received at a port of a switch, the identified virtual address is used to retrieve an indication of another port of the switch through which the data is transmitted.

27. The network manager of claim 20 wherein a path is established between the source node and each of a plurality of destination nodes by identifying ports of switches for each path.

28. The network manager of claim 20 wherein the switches are interconnect fabric modules.

29. The network manager of claim 20 wherein when a port of a switch receives data with a virtual address that has not been set for the port, the port does not forward the data.

30. The network manager of claim 20 wherein each switch has a source-side port and the identified virtual address is not currently used by any of the source-side ports.

31. The network manager of claim 20 wherein each switch has a source-side port and the identified virtual address is currently used by a source-side port when part of the path is shared by two source nodes sending data to the same destination node.

32. A network manager for establishing a path between a source node and a destination node through a network of routing devices, comprising:

means for identifying ports of routing devices forming a path between the source node and the destination node, each routing device of the path having an identified source-side port and an identified destination-side port;

means for identifying a virtual address for sending data from the source node to the destination node; and setting each of the identified source-side ports to route data sent to the identified virtual address through the identified destination-side port of the routing device wherein the data is an InfiniBand frame, wherein the InfiniBand frame is changed to a Fibre Channel frame.

33. The network manager of claim 32 wherein a routing device is a switch.

34. The network manager of claim 32 wherein each port of each routing device has a means for mapping virtual addresses to another port of the routing device.

35. The network manager of claim 32 including means for, when data is received at a port of a routing device, retrieving an indication of another port using the identified virtual address and sending the data out of the routing device through the other port.

36. The network manager of claim 32 including means for establishing a path between the source node and each of a plurality of destination nodes by identifying ports of routing devices for each path.

* * * * *